United States Patent Office 2,704,828
Patented Mar. 22, 1955

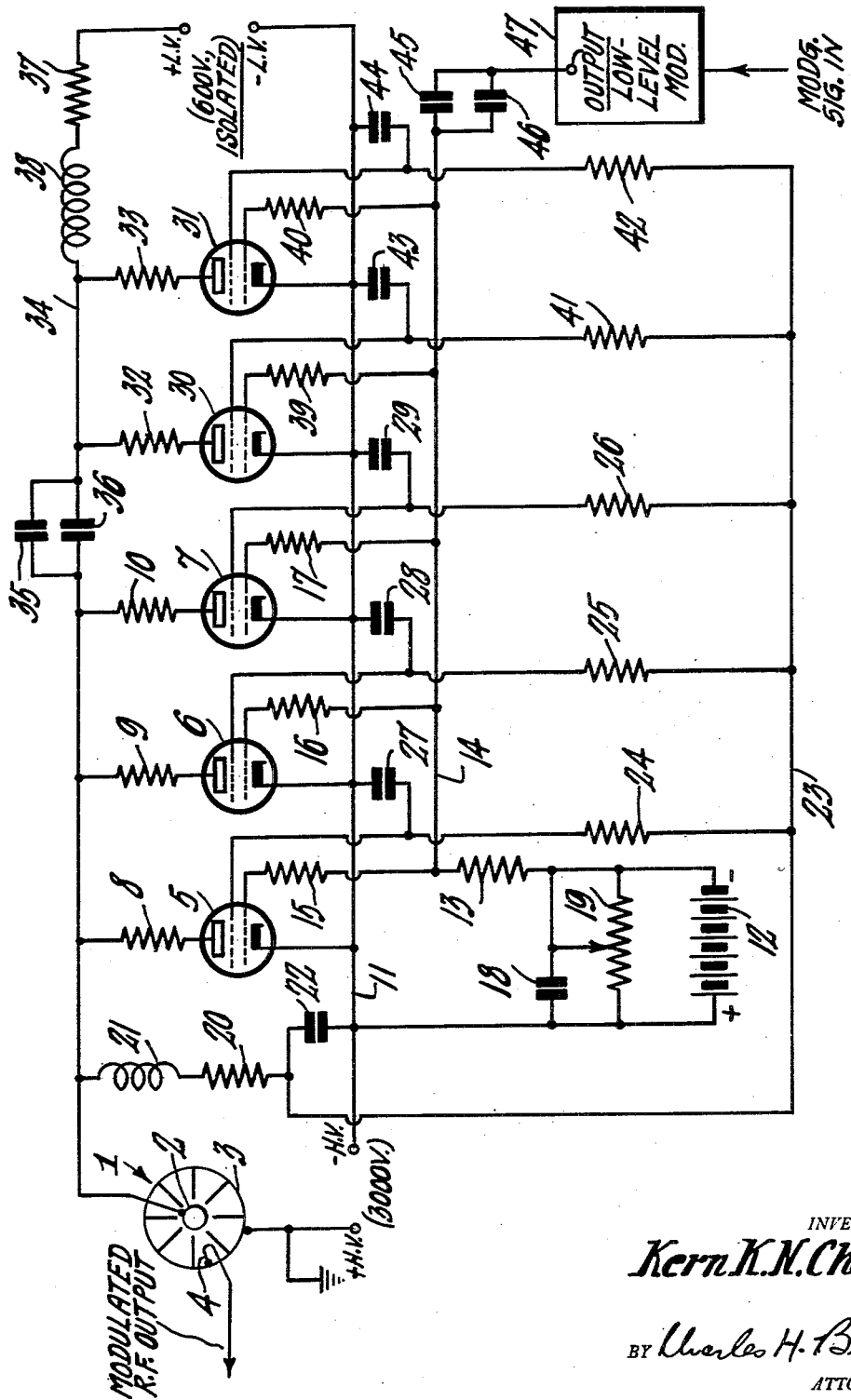

2,704,828

MODULATOR CIRCUIT

Kern K. N. Chang, Princeton, N. J., assignor to Radio Corporation of America, a corporation of Delaware Application December 3, 1952, Serial No. 323,913

The terminal 15 years of the term of the patent to be granted has been disclaimed 18 Claims. (Cl. 332—5)

This invention relates to modulator circuits, and more particularly to a modulator circuit especially suitable for the modulation of a magnetron oscillator.

For the amplitude modulation of a magnetron oscillator, modulators of the series type are ordinarily employed, as this circuit arrangement has been found to be the most practical and also the simplest. In a series-type modulator, the anode-cathode path of the modulator tube is connected in series with the anode-cathode path of the magnetron, across a source of potential. This means that the magnetron anode current flows through the modulator tube, so that such tube must have the same rated anode current as the fixed rated anode current of the magnetron. In addition, for the most efficient operation of the circuit, the rated load of the modulator tube must be approximately the same as the input impedance or resistance of the magnetron, since the magnetron serves as the load for the modulator tube.

In addition, if the modulator is expected to carry video modulating frequencies as high as 4 megacycles or even higher, the modulator tube or tubes must have a very low shunt output (interelectrode) capacitance. This is necessary to obtain sufficient bandwith of response. If this capacitance is not sufficiently low, the voltage across the modulator, at high video frequencies, will fall off too rapidly and will be insufficient to give the depth of modulation required by present TV standards.

Unfortunately, none of the present simple series modulators are capable of filling the foregoing requirements. For example, seldom does an ordinary simple modulator have a rated anode current on the order of a few amperes, which is the rated anode current of magnetrons giving a few kilowatts of output. Of course, an oversized modulator will give high rated anode current and can serve the purpose, but this will increase the cost of the device and also is not good practice.

An alternative is to connect a plurality of modulator tubes in parallel, such that the sum of the rated anode currents of these tubes equals the rated anode current of the magnetron. However, for reasons given below, this will not provide the voltage necessary to modulate the magnetron to the required depth, particularly when the modulator tubes must pass high video frequencies. This can be explained by the following equation:

$$V_L = n(G_m e_s) R_L \qquad (1)$$

which is true for modulators having high anode resistance tubes and a low resistance load. In Equation 1, $V_L$ is the output voltage across the load, $n$ is the number of modulator tubes paralleled, $G_m$ is the transconductance of each modulator tube, $e_s$ is the input signal voltage to the modulator grids, and $R_L$ is the load resistance. $V_L$, the voltage across the load, is fixed for any particular magnetron (modulator load) and for any predetermined standard depth of modulation. The quantity between the parentheses in Equation 1 represents the equivalent anode current of a single modulator tube, and one way to increase the modulator output voltage to the value of $V_L$ that is required, is to increase the number $n$ of tubes that are paralleled. As previously stated, an increase in the number of paralleled modulator tubes also tends to bring the sum of the rated anode currents of all the modulator tubes more nearly in line with the rated magnetron anode current, a requirement for the ordinary series modulator. However, as more modulator tubes are paralleled to reach the correct rated anode current and the right gain figure (thus providing the output voltage $V_L$ that is required), the total shunt interelectrode capacitance is increased because the addition of capacitances in parallel increases the total capacitance. This increase in total shunt output capacitance causes the output voltage developed across the modulator to drop off markedly at the higher video frequencies. This dropping-off of the voltage opposes or counteracts the increase of the modulator output voltage (increase of the modulator gain) resulting from the adding of more tubes in parallel. This effect causes the gain obtained to be less than what is required to reach the desired depth of modulation. It has been found that with a conventional series modulator circuit, the maximum depth of modulation which can be realized at a modulating frequency of 4 megacycles is only 60%. This is insufficient for TV practice.

There is another effect which also prevents obtaining the output voltage $V_L$ required, in the case of the simple series modulator, by means of the expedient of merely increasing the number of modulator tubes paralleled. As the number $n$ of tubes paralleled is increased in an attempt to increase the modulator output voltage to the required value of $V_L$, the anode current in each one must be reduced, since in a series modulator circuit of this type the total anode current in all the modulator tubes must equal the magnetron anode current. This reduction in the anode current of each tube causes a reduction in its transconductance $G_m$, since the $G_m$ of vacuum tubes varies in the same direction as the anode current, though not necessarily in direct proportion thereto. This reduction or decrease in $G_m$ (see Equation 1) cuts down or decreases the gain in each tube, so that the overall gain of the modulator is still not enough to provide the required $V_L$, even though $n$ has been increased in Equation 1.

In Equation 1, $R_L$ is fixed or established by the particular magnetron used (it will be remembered that in a series modulator circuit the magnetron is the load for the modulator tubes), $V_L$ is fixed by the percentage modulation desired and by the magnetron characteristics, and $e_s$ is fixed by the optimum operating range of the grid swing of the modulator tubes. To satisfy Equation 1, for constant $R_L$, $V_L$ and $e_s$, the product of $n$ and $G_m$ should have a constant value. In order to satisfy the necessary condition of a very low total shunt output capacitance $n$ should be made as small as possible, since adding tube output capacitances in parallel increases the total output capacitance. If $n$ is to be as small as possible, $G_m$ should be made as large as possible, since the product of $n$ and $G_m$ should be constant. In other words, a minimum number $n$ of tubes may be used if a maximum $G_m$ is used in each tube. However, a large value of $G_m$ calls for a large value of anode current in each tube, since increasing anode current is causally related to increasing $G_m$. However, this large value of anode current in each tube is not necessary to correspond to the magnetron anode current; the value of anode current in each tube necessary to correspond to the magnetron anode current would not be this large. To match the magnetron anode current, the modulator anode current would have to be reduced and this would mean a smaller $G_m$ in each tube; this would not ensure the minimum number $n$ of tubes, since $n$ would then have to be increased to make the product $n$ $G_m$ a constant. In other words, use of a conventional series modulator for the magnetron entails the drawback that the minimum number of tubes and the optimum anode current (and therefore the optimum $G_m$) cannot both be realized at the same time.

An object of this invention is to devise a modulator circuit for a magnetron oscillator which, so far as I am aware, enables a greater depth of modulation to be achieved than has heretofore been possible.

Another object is to provide a modulator circuit for magnetrons which enables a depth of modulation sufficient for television service to be achieved, even at high television (TV) video frequencies.

A further object is to accomplish the aforesaid objects with a minimum number of modulator tubes, thereby keeping the cost of the modulator circuit as low as possible.

A still further object is to devise a novel high-level modulator circuit for magnetrons.

The foregoing and other objects of the invention are accomplished, briefly, in the following manner: a plurality of modulator tubes are used, the input or control grid circuits of which are connected in parallel to the source of modulating signals. These tubes are divided into two groups, the anode-cathode paths of the first group being paralleled and each such path connected directly, through a connection capable of passing direct current, in series with the anode-cathode path of a magnetron oscillator to be modulated. The anode-cathode paths of the second group are paralleled, but are connected to the magnetron anode-cathode path only through a D. C. blocking (or A. C. coupling) impedance. Thus, for the A. C. modulating frequencies, the anode-cathode paths of all of the modulator tubes are essentially in parallel with each other and each such path is in series with the anode-cathode path of the magnetron oscillator, but the unidirectional anode current of the magnetron flows through the anode-cathode paths of only the first group of modulator tubes.

A description of the invention follows, in conjunction with the accompanying drawing, wherein the single figure is a schematic diagram of a circuit according to this invention.

Now referring to the drawing for a more detailed description of the present invention, a magnetron oscillator 1 has the usual centrally-located electron-emissive cathode 2 surrounded by a plurality of cavity resonators which constitute the anode 3 and which form the outer evacuated envelope of the magnetron 1. Magnetron oscillator 1 is provided with a magnetic field, not shown, and operates in a conventional way, when energized by a suitable operating potential applied between its anode and cathode, to produce oscillatory energy of a frequency determined largely by the dimensions of the internal cavity resonators. Such oscillatory energy may be abstracted from the anode structure by a coupling loop 4, for utilization in an external load device. The function of the high-level modulator of this invention is to effect amplitude modulation of the oscillatory energy output of magnetron 1 in accordance with a modulating signal.

Anode 3 of magnetron 1 is grounded or connected to a point of zero reference potential and is also connected to the positive terminal +H. V. of a unidirectional high voltage source, for example of 3,000 volts. Three similar evacuated electron discharge devices 5, 6 and 7, for example of the tetrode type 4X150A, form a group of "D. C." modulator tubes and have their respective anodes connected each through a separate respective parasitic-suppressing resistor 8, 9 and 10 directly to the magnetron cathode 2. Thus, the anodes of tubes 5-7 are all connected substantially directly to magnetron cathode 2, through connections capable of passing direct current. In order to complete the magnetron energization circuit and to connect the anode-cathode path of each of the tubes 5-7 directly in series with the anode-cathode path of the magnetron 1, the cathodes of tubes 5-7 are all connected together and to a bus 11 which is in turn connected to the negative terminal —H. V. of the high voltage or 3,000-volt source. Thus, it may be seen that the total D. C. anode current of the magnetron 1 is split between tubes 5-7 and is carried by these three tubes in parallel. Also, it may be seen that the anode potential for operating tubes 5-7 is derived from the main high voltage power supply for the magnetron.

Control grid bias is applied to tubes 5, 6 and 7 by means of a separate bias supply 12 illustrated as a battery 12, on the order of 45 volts, for example. The positive terminal of this battery is connected to cathode bus 11, while the negative terminal thereof is connected through a resistor 13 to the control grid bus 14. The respective control grids of tubes 5, 6 and 7 are connected through separate parasitic-suppressing resistors 15, 16 and 17 to bus 14. Battery 12 is bypassed for alternating current by means of a capacitor 18 connected thereacross. In order to enable adjustment of the control grid bias voltage, a potentiometric voltage-dividing resistor 19 is connected across battery 12, the movable tap on this resistor being connected to the negative terminal of said battery. Screen grid bias for tubes 5, 6 and 7 is obtained from a voltage dropping arrangement consisting of a resistor 20 and an inductance 21 connected in series between screen grid bus 23 and the magnetron cathode 2. A capacitor 22 is connected between bus 23 and the negative terminal of the high voltage supply. The respective screen grids of tubes 5, 6 and 7 are connected through separate parasitic-suppressing resistors 24, 25 and 26 to bus 23. The shunt inductive feed, including inductance 21, has a certain peaking effect which improves the bandwidth of the system. The respective screens of tubes 5, 6 and 7 are bypassed to the cathodes thereof by way of capacitors 27, 28 and 29.

The D.-C. electrode voltages on the "D. C." tubes 5, 6 and 7 are so adjusted that the anode current through these tubes causes them to operate at optimum transconductance. Knowing this anode current for each tube, the number of tubes selected for the "D. C." group 5-7 should of course be such that the combined anode current of these tubes is equal to the fixed rated D. C. anode current of the magnetron 1, since tubes 5, 6 and 7 together must carry the total D. C. anode current of such magnetron. In the circuit of this invention, this number of tubes is selected to be proper for the total D. C. anode current of the magnetron, even though this number may be insufficient to produce the required $V_L$ necessary for the desired depth of modulation of the magnetron. This provides a substantial degree of freedom for the system designer. The tubes 5, 6 and 7 are of a type which will provide optimum transconductance at the appropriate anode current for each tube, taking into consideration the number of tubes to be utilized. In a typical modulator system according to the invention which was actually built and successfully tested, the magnetron used was a type A-128, which has a rated D. C. anode current of 500 milliamperes for one kilowatt output. Each of the tubes 5, 6 and 7 was operated at an anode current of substantially 170 milliamperes, which gives the optimum transconductance for these tubes of the 4X150A type. The anode voltage effective on tubes 5, 6 and 7 was 400 volts (the rest of the 3000-volt drop occurring in the magnetron 1), the screen voltage of these tubes was 250 volts, while the grid bias was 20 volts negative. The magnetron operated at 825 megacycles.

Two evacuated electron discharge devices 30 and 31 constitute an "A. C." group of modulator tubes, these tubes preferably being similar to tubes 5-7 and therefore being, for example, of the 4X150A type. The respective anodes of tubes 30 and 31 are connected through separate parasitic-suppressing resistors 32 and 33 to a common anode lead 34. Lead 34 is connected to magnetron cathode 2 only through a capacitive connection including a pair of capacitors 35 and 36 connected in parallel. The capacitors 35 and 36 constitute an A. C. coupling or D. C. blocking connection, one which prevents the unidirectional or D. C. anode current of the magnetron from flowing through tubes 30 and 31. Thus, the anodes of tubes 30 and 31 are also connected to the anodes of tubes 5, 6 and 7 only through this capacitive impedance which is incapable of passing direct current.

To provide anode potential for tubes 30 and 31, a separate isolated low voltage unidirectional power supply, on the order of 600 volts, is utilized. The positive terminal +L. V. of this supply is connected through a resistor 37 and a radio frequency choke 38 to the anode lead 34, while the negative terminal —L. V. of this supply is connected to the common cathode bus 11, to which the cathodes of tubes 30 and 31 are connected. For control grid bias on tubes 30 and 31, the control grids of these tubes are connected through separate parasitic-suppressing resistors 39 and 40 to bus 14. Thus, exactly the same control grid bias voltage is applied to tubes 30 and 31 as is applied to tubes 5-7. Screen grid voltage for tubes 30 and 31 is obtained by connecting the respective screen grids of these tubes through separate parasitic-suppressing resistors 41 and 42 to bus 23. Thus, exactly the same screen voltage is applied to tubes 30 and 31 as is applied to tubes 5-7. The respective screens of tubes 30 and 31 are bypassed to the cathodes thereof by way of capacitors 43 and 44.

The D.-C. electrode voltages on the "A. C." tubes 30 and 31 are so adjusted that the anode current through these tubes causes them to operate at their optimum transconductance. They then preferably are operated exactly like tubes 5, 6 and 7, at an anode voltage of 400 volts and an anode current of 170 milliamperes per tube.

Thus, all of the modulator tubes 5–7, 30 and 31 are operated at optimum transconductance $G_m$ which, as previously stated, is preferably a maximum to give a minimum total number of tubes $n$.

The control grids of all of the modulator tubes 5–7, 30 and 31 are supplied in parallel from a common modulating signal input. This is effected by connecting control grid bus 14, through a capacitive connection including a pair of capacitors 45 and 46 connected in parallel, to the output of a low-level modulator 47, to the input of which a modulating signal is supplied from a suitable source. In this way, the modulating signal voltage is applied in parallel to the control grids of all the modulator tubes in the high-level modulator illustrated.

The capacitors 35 and 36 pass the entire range of modulating frequencies appearing at the output of modulator 47, which range may extend, for example, from 60 cycles to 4 megacycles, if TV video modulation is used. Thus, for currents or voltages of modulation frequency, all of the tubes 5, 6, 7, 30 and 31 are essentially in parallel as far as their effect on the magnetron is concerned. For modulation frequencies, all five of the modulator tubes are in parallel with each other and each of them is in series with the magnetron, so that amplitude modulation of the magnetron current is effected by a cathode-series-modulation arrangement. For alternating currents the overall gain of the modulator circuit disclosed is the total gain of all five of the modulator tubes. Therefore, once the number of tubes in the "D. C." group has been chosen to be properly correlated (as previously described) to the required fixed D. C. magnetron anode current (that is, the stable anode current without modulation), the number of (added) tubes in the "A. C." group is chosen such that the overall gain of the entire number of modulator tubes is proper, that is, so that the modulator output voltage required (to modulate the magnetron to the required depth) is produced with a given input modulating or signal voltage to the modulator stage illustrated.

For a circuit actually built according to this invention, to modulate a one-kw. magnetron with 85% modulation, the change of output voltage across the modulator was about 60 volts R. M. S., for a driving (input) grid voltage of 10 volts R. M. S.

In the circuit of this invention, since all of the modulator tubes are operated at optimum (which in this case means maximum) transconductance $G_m$, the modulator output voltage $V_L$ (in Equation 1) necessary to modulate the magnetron to the desired depth is easily obtained. This is true even at 4 or 5 megacycles input (modulation) frequency. At the same time, since $G_m$ in Equation 1 is a maximum, the number of tubes $n$ is a minimum. Also, since the "D. C." group of tubes 5–7 is isolated for D. C. from the "A. C." group 30—31, the correct number of tubes in the "D. C." group, each operating at optimum (or maximum) anode current, may be used to match the required magnetron D. C. or steady (unmodulated) anode current.

It will be noted that two capacitors in parallel are used at 35, 36. This is more or less standard practice, one of these, say 35, being a mica capacitor of low capacitance value which, due to its composition and capacitance value, easily passes frequencies in the R. F. range, while the other, say 36, is a paper capacitor of much larger capacitance value which provides a good low frequency response. The same idea is used for condensers 45, 46.

The following values are given as representative for a circuit according to this invention which was built and successfully tested. These values are given by way of example only and not by way of limitation.

| | |
|---|---|
| Resistors 8, 9, 10, 15, 16, 17, 24, 25, 26, 32, 33, 39, 40, 41, 42 | 33 ohms each. |
| Resistor 13 | 10,000 ohms. |
| Resistor 19 | 50,000 ohms. |
| Resistor 20 | 7,500 ohms. |
| Resistor 37 | 375 ohms. |
| Capacitor 18 | 0.1 mfd. |
| Capacitor 22 | 15 mfd. |
| Capacitors 27, 28, 29, 43, 44 | 2200 mmfd. each. |
| Capacitor 35 | .01 mfd. mica, 1000 v. |
| Capacitor 36 | 4 mfd. paper, 1000 v. |
| Capacitor 45 | .01 mfd. mica, 3000 v. |
| Capacitor 46 | 4 mfd. paper, 3000 v. |

To put the modulator circuit of this invention into operation, the "D. C." tubes 5–7 are first energized, along with the magnetron 1, with no modulating voltage, the proper precautions being taken to apply grid bias to tubes 5–7, so that the anode current will not be excessive. Then, after the magnetron has begun oscillating and has reached its proper stable anode current, the "A. C." tubes 30 and 31 are properly biased and energized. Thereafter, the modulating voltage is applied to all of the tubes, so that the magnetron 1 has applied to it the full modulating voltage.

It will be noted that a high-level modulator circuit has been described, in which the high-energy-level output of the magnetron is modulated directly. It is also pointed out that the D. C. or steady anode current of the magnetron 1 flows through only the three tubes 5, 6 and 7 in parallel, while the alternating component of the magnetron anode current (resulting from the applied modulation and superimposed on the D. C. magnetron anode current) flows through all five of the tubes 5, 6, 7, 30 and 31 in parallel.

What is claimed is:

1. In a modulation circuit for an electron tube having an anode and a cathode: an electron discharge device having an anode, a cathode and a control electrode, a source of unidirectional potential, means coupling the anode-cathode path of said device in series with the anode-cathode path of said tube across said source, another electron discharge device having an anode, a cathode and a control electrode, a direct current blocking connection between the anode of said other device and the anode of said first-named device, and means for applying a modulating signal to all of said control electrodes.

2. A circuit in accordance with claim 1, wherein said electron tube is a magnetron.

3. A circuit in accordance with claim 1, wherein the anode of the first-named device is coupled to the cathode of said electron tube through a connection capable of passing direct current.

4. A circuit in accordance with claim 1, wherein said electron tube is a magnetron, and wherein the anode of the first-named device is coupled to the magnetron cathode through a connection capable of passing direct current.

5. In a modulation circuit for an electron tube having an anode and a cathode: an electron discharge device having an anode, a cathode, and a control electrode, a source of unidirectional potential, means coupling the anode-cathode path of said device in series with the anode-cathode path of said tube across said source, another electron discharge device having an anode, a cathode, and a control electrode, another source of unidirectional potential, means coupling the anode-cathode path of said other device across said other source, capacitive means connecting the anode of said other device to the anode of said first-named device, and means for applying a modulating signal to all of said control electrodes.

6. A circuit in accordance with claim 5, wherein said electron tube is a magnetron.

7. A circuit in accordance with claim 5, wherein the anode of the first-named device is coupled to the cathode of said electron tube through a connection capable of passing direct current.

8. A circuit in accordance with claim 5, wherein said electron tube is a magnetron, and wherein the anode of the first-named device is coupled to the magnetron cathode through a connection capable of passing direct current.

9. In a modulation circuit for an electron tube having an anode and a cathode: a plurality of electron discharge devices each having an anode, a cathode, and a control electrode, a source of unidirectional potential, means coupling the anode-cathode paths of said devices in parallel with each other and each in series with the anode-cathode path of said tube across said source, another electron discharge device having an anode, a cathode, and a control electrode, a direct current blocking connection between the anode of said other device and the anodes of said first named-devices, and means for applying a modulating signal to all of said control electrodes.

10. A circuit in accordance with claim 9, wherein said electron tube is a magnetron.

11. A circuit in accordance with claim 9, wherein the anodes of the first-named devices are coupled to the cathode of said electron tube through a connection capable of passing direct current.

12. In a modulation circuit for an electron tube having an anode and a cathode: an electron discharge device having an anode, a cathode, and a control electrode, a source of unidirectional potential, means coupling the anode-cathode path of said device in series with the anode-cathode path of said tube across said source, a plurality of other electron discharge devices each having an anode, a cathode, and a control electrode, a direct current blocking connection between the anodes of said other devices and the anode of said first-named device, and means for applying a modulating signal to all of said control electrodes.

13. A circuit in accordance with claim 12, wherein said electron tube is a magnetron.

14. A circuit in accordance with claim 12, wherein the anode of the first-named device is coupled to the cathode of said electron tube through a connection capable of passing direct current.

15. In a modulation circuit for an electron tube having an anode and a cathode: a plurality of electron discharge devices each having an anode, a cathode, and a control electrode, a source of unidirectional potential, means coupling the anode-cathode paths of said devices in parallel with each other and each in series with the anode-cathode path of said tube across said source, a plurality of other electron discharge devices each having an anode, a cathode, and a control electrode, a direct current blocking connection between the anodes of said other devices and the anodes of said first-named devices, and means for applying a modulating signal to all of said control electrodes.

16. A circuit in accordance with claim 15, wherein said electron tube is a magnetron.

17. A circuit in accordance with claim 15, wherein the anodes of the first-named devices are coupled to the cathode of said electron tube through a connection capable of passing direct current.

18. A circuit in accordance with claim 15, wherein said electron tube is a magnetron, and wherein the anodes of the first-named devices are coupled to the magnetron cathode through a connection capable of passing direct current.

References Cited in the file of this patent

UNITED STATES PATENTS

| | | |
|---|---|---|
| 2,061,947 | Lindenblad | Nov. 24, 1936 |
| 2,080,571 | Hollmann | May 18, 1937 |
| 2,590,784 | Moulton | Mar. 25, 1952 |